(12) United States Patent
Morioka

(10) Patent No.: US 11,083,016 B2
(45) Date of Patent: Aug. 3, 2021

(54) WIRELESS COMMUNICATION DEVICE

(71) Applicant: Sony Corporation, Tokyo (JP)

(72) Inventor: Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 285 days.

(21) Appl. No.: 16/099,197

(22) PCT Filed: Apr. 24, 2017

(86) PCT No.: PCT/JP2017/016138
§ 371 (c)(1),
(2) Date: Nov. 6, 2018

(87) PCT Pub. No.: WO2017/212807
PCT Pub. Date: Dec. 14, 2017

(65) Prior Publication Data
US 2020/0314905 A1    Oct. 1, 2020

(30) Foreign Application Priority Data

Jun. 10, 2016 (JP) .............................. JP2016-116122

(51) Int. Cl.
*H04W 74/00* (2009.01)
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC .......................... H04W 74/0816; H04W 84/12
See application file for complete search history.

(56) References Cited

U.S. PATENT DOCUMENTS

2012/0320856 A1*  12/2012  Kim .................. H04W 74/0816
                                                  370/329
2013/0294289 A1   11/2013  Kneckt
(Continued)

FOREIGN PATENT DOCUMENTS

EP         1 662 708 A1      5/2006
KR      20160009484 A        1/2016
(Continued)

OTHER PUBLICATIONS

European Extended Search Report dated Apr. 4, 2019, issued in corresponding European Patent Application No. 17809989.1.
(Continued)

*Primary Examiner* — Khai M Nguyen
(74) *Attorney, Agent, or Firm* — Xsensus LLP

(57) ABSTRACT

[Object] To propose a mechanism which is capable of improving utilization efficiency of frequency resources in wireless communication.

[Solution] A wireless communication device including: a processing unit configured to generate a first frame in which second frame transmission period information corresponding to a frequency is stored in a second region which is subsequent to a first region in which first frame transmission period information is stored; and a transmission unit configured to transmit the first frame. A wireless communication device including: a reception unit configured to receive a first frame in which second frame transmission period information corresponding to a frequency is stored in a second region which is subsequent to a first region in which first frame transmission period information is stored; and a (Continued)

transmission unit configured to stand by for transmission of a frame at a frequency based on the first frame transmission period information.

19 Claims, 12 Drawing Sheets

(56) References Cited

U.S. PATENT DOCUMENTS

| | | | | |
|---|---|---|---|---|
| 2015/0172012 A1* | 6/2015 | Abeysekera | ........... | H04J 11/005 370/329 |
| 2015/0271850 A1* | 9/2015 | Kim | ...................... | H04W 74/08 370/329 |
| 2017/0006635 A1* | 1/2017 | Huang | ................. | H04L 5/0094 |
| 2019/0029041 A1* | 1/2019 | Tomeba | ................ | H04W 72/04 |

FOREIGN PATENT DOCUMENTS

| | | |
|---|---|---|
| WO | WO-2011099791 A | 8/2011 |
| WO | 2014/014094 A1 | 1/2014 |
| WO | 2015/096065 A1 | 7/2015 |

OTHER PUBLICATIONS

Fukushima, M. et al., "Multi-channel MAC Protocol with Multi-busytone in Ad-hoc Networks," (Kodo Simulation Tajigen Ido Tsushinmo), Journal of the Japan Societyfor Simulation Technology, vol. 29, No. 2, 2010, pp. 57-66 (See English Translation).

IEEE Std 802.11™-2007 (Revision of IEEE Std 802.11-1999), "IEEE Standard for Information technology—Telecommunications and information exchange between systems—Local and metropolitan area networks—Specific equirements Part 11: Wireless LAN Medium Access Control (MAC) and Physical Layer (PHY) Specifications," IEEE 3 Park Avenue, New York, NY 10016-5997, USA, Jun. 12, 2007, pp. 1-1232.

Kubo, Y. and Nozaki, M., "Interference avoidance based on channel switching for large scale wireless sensor networks", The Institute of Electronics, Information and Communication Engineers, IEICE Technical Report USN2011-52(Oct. 2011), vol. 111, No. 263, Oct. 2011, pp. 171-176 (See English Translation).

English-language Translation of International Search Report and Written Opinion for International Application No. PCT/JP2017/016138, dated Jul. 18, 201.

* cited by examiner

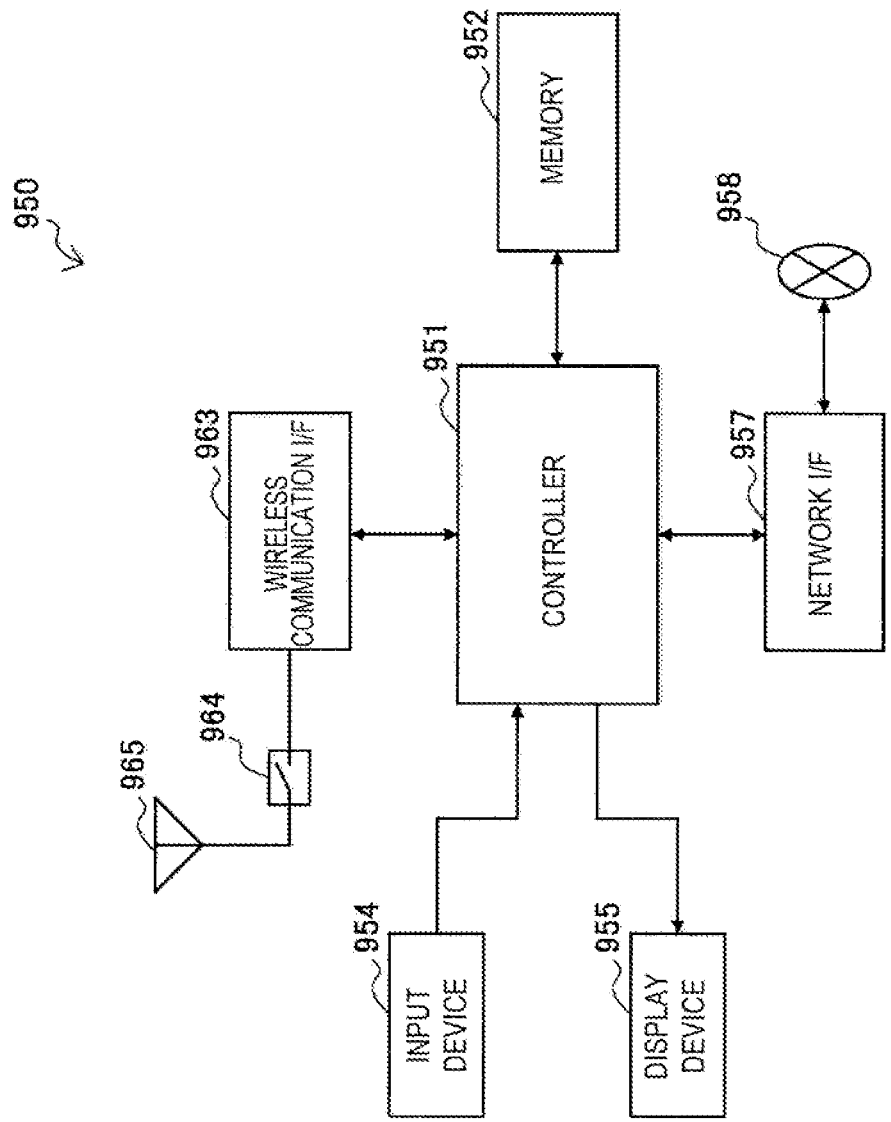

WIRELESS COMMUNICATION DEVICE

CROSS-REFERENCE TO RELATED APPLICATIONS

This application is a National Stage Application based on PCT/JP2017-016138, filed 24 Apr. 2017, and claims priority to Japanese Patent Application No. 2016-116122 filed 10 Jun. 2016, the entire contents of which being incorporated herein by reference.

TECHNICAL FIELD

The present disclosure relates to wireless communication devices.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of a technique for improving communication efficiency, a technique called virtual carrier sensing is known. Specifically, as disclosed in the non-patent literature 1, a technique for controlling a network allocation vector (NAV) using a mechanism such as request to send (RTS)/clear to send (CTS) is known. For example, a transmission device that desires data transmission transmits an RTS frame to a reception device which is a destination of data transmission, and the reception device transmits a CTS frame to the transmission device in a case in which data transmission is permitted. At this time, wireless communication devices other than destinations of the RTS frame and the CTS frame set a NAV and stop data transmission during a NAV period. Accordingly, it is considered that communication collision is avoided, and communication can be performed efficiently as a result.

CITATION LIST

Patent Literature

Non-Patent Literature 1: IEEE Std 802.11-2007, IEEE Standard for Information technology-Telecommunications and information exchange between systems-Local and metropolitan area networks-Specific requirements Part 11: Wireless LAN Medium Access Control (MAC) and Physical Layer (PHY) Specifications

DISCLOSURE OF INVENTION

Technical Problem

However, more effective utilization of wireless communication resources is desired. For example, in RTS/CTS in related art as specified in the non-patent literature 1, a NAV is set over the whole available frequency bands. Therefore, in the case where communication based on RTS/CTS is performed using only part of the frequency bands, other frequency bands are available in the NAV period. In other words, the other frequency bands are not effectively utilized.

Therefore, the present disclosure proposes a mechanism which is capable of improving utilization efficiency of frequency resources in wireless communication.

Solution to Problem

According to the present disclosure, there is provided a wireless communication device including: a processing unit configured to generate a first frame in which second frame transmission period information corresponding to a frequency is stored in a second region which is subsequent to a first region in which first frame transmission period information is stored; and a transmission unit configured to transmit the first frame.

In addition, according to the present disclosure, there is provided a wireless communication device including: a reception unit configured to receive a first frame in which second frame transmission period information corresponding to a frequency is stored in a second region which is subsequent to a first region in which first frame transmission period information is stored; and a transmission unit configured to stand by for transmission of a frame at a frequency based on the first frame transmission period information.

Advantageous Effects of Invention

As described above, according to the present disclosure, a mechanism which is capable of improving utilization efficiency of frequency resources in wireless communication is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is a block diagram illustrating an example of a schematic configuration of a wireless access point.

MODE(S) FOR CARRYING OUT THE INVENTION

Figure 1:
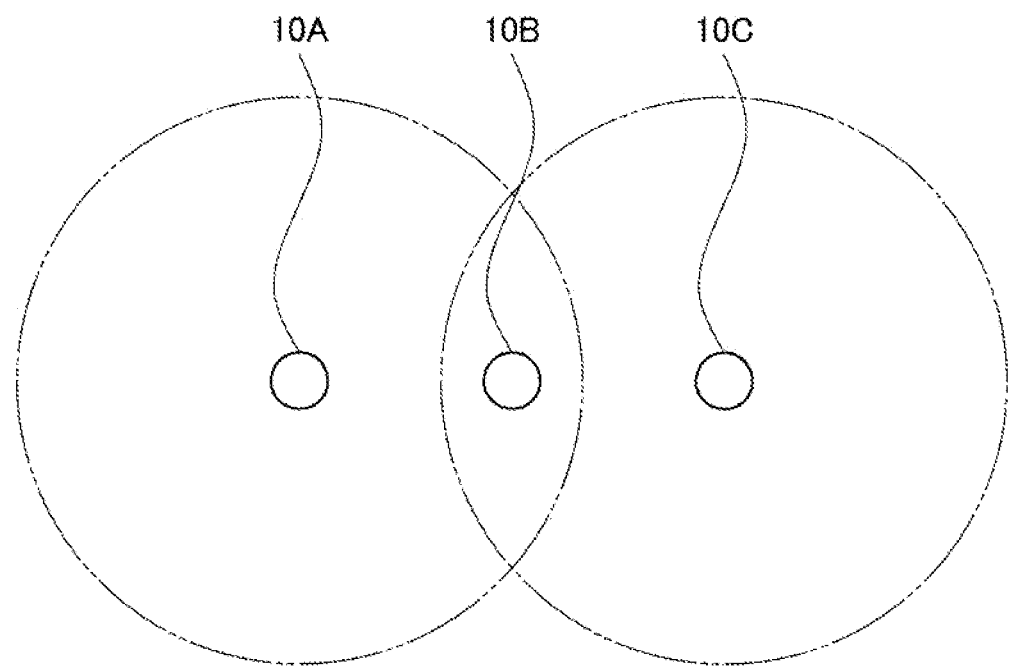
FIG. 1 is a diagram for explaining a hidden terminal problem.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function are distinguished as necessary like a STA 10A and a STA 10B. However, in a case where it is unnecessary to distinguish elements having substantially the same function, only the same reference numeral is added. For example, in a case where it is unnecessary to particularly distinguish the STA 10A and the STA 10B, they are simply referred to as "STAs 10."

Note that description will be provided in the following order.
1. Introduction
2. One embodiment of present disclosure
2.1. Configuration of device
2.2. Functions of device
2.3. Processing of device
2.4. Operation examples
2.5. Conclusion of one embodiment of present disclosure
2.6. Modified examples
3. Application example
4. Conclusion

1. Introduction

First, a technique relating to a wireless communication device according to one embodiment of the present disclosure will be described. As the technique, there is virtual carrier sensing as described above. First, a technical problem in the case where virtual carrier sensing is not utilized, which is so called a hidden terminal problem, will be described with reference to FIG. 1. FIG. 1 is a diagram for explaining a hidden terminal problem.

A case will be assumed where, after an STA 10A starts communication with an STA 10B, a request for communication with the STA 10B occurs at an STA 10C. In this case, in the case where a range reached by a signal transmitted from the STA 10A is a range indicated with a long dashed double-short dashed line in FIG. 1, the signal transmitted from the STA 10A does not reach the STA 10C. Therefore, the STA 10C cannot detect the signal from the STA 10A, and determines that the STA 10B is put into a communication enabled state. As a result, a signal addressed to the STA 10B is transmitted from the STA 10C during communication between the STA 10A and the STA 10B, and the both signals collide with each other, which inhibits communication between the STA 10A and the STA 10B.

Figure 2:
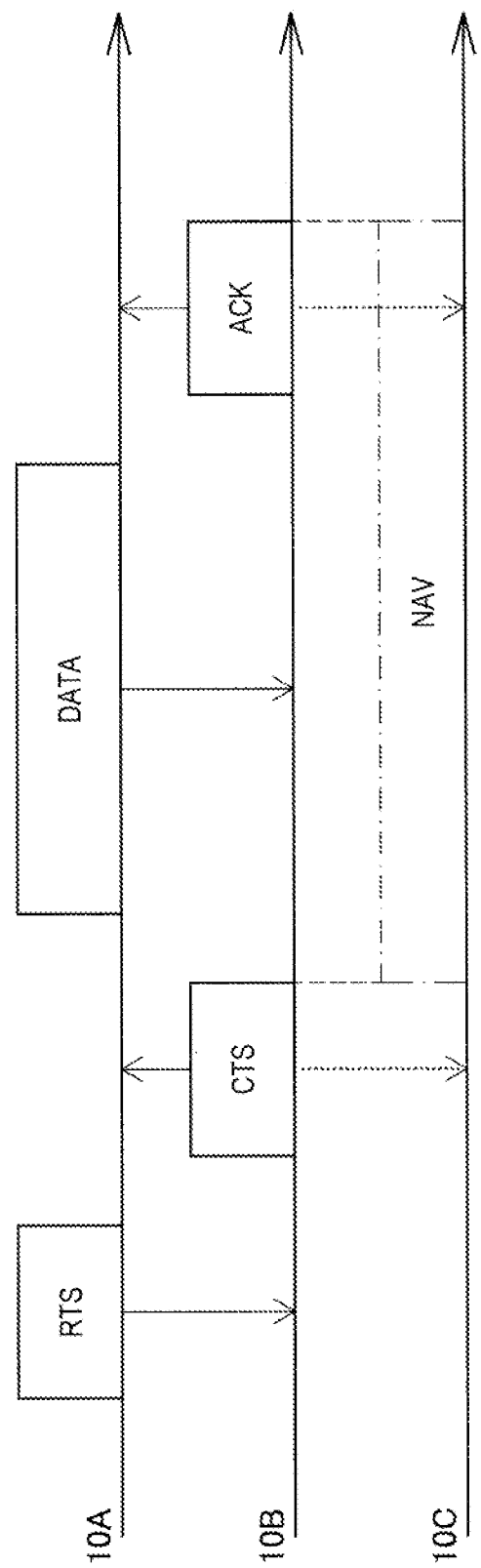
FIG. 2 is a diagram illustrating an example of virtual carrier sensing using RTS and CTS.

To solve such a hidden terminal problem, a technique called virtual carrier sensing is proposed. Specifically, in the virtual carrier sensing, a NAV is controlled using a mechanism such as RTS/CTS. Typical flow of the virtual carrier sensing will be described with reference to FIG. 2. FIG. 2 is a diagram illustrating an example of virtual carrier sensing using the RTS and the CTS.

As illustrated in FIG. 2, the STA 10A which desires to transmit data transmits an RTS frame to the STA 10B which becomes a destination of data transmission. The STA 10B which receives the RTS frame transmits a CTS frame to the STA 10A in the case where data transmission by the STA 10A is permitted.

Here, when the STA 10C other than the STA 10A and the STA 10B which are destinations of the RTS frame or the CTS frame receives the RTS frame or the CTS frame, the STA 10C sets a NAV on the basis of frame transmission period information stored in the received RTS frame or CTS frame. During the NAV period, the STA 10C stops transmission of frames. Therefore, communication between the STA 10A and the STA 10C is not inhibited by collision of frames due to the STA 10C.

The STA 10A and the STA 10B communicate data frames after communication of the CTS frame. In the case where the data frame is successfully communicated, an acknowledgement (ACK) frame is communicated, and data transmission is finished. Further, because the NAV period has elapsed at a time point at which communication relating to data transmission between the STA 10A and the STA 10B is finished, the STA 10C releases the NAV. By this means, the STA 10C can access a transmission path.

However, in the above-described RTS/CTS, there exist wireless communication resources which are not used in data transmission. For example, in the RTS/CTS, a NAV is set over all the frequency bands. On the other hand, it can be considered that communication is performed using only part of the frequency bands among the frequency bands available for frame transmission. In this case, frequency bands other than the part of the frequency bands are not utilized in the set NAV period.

Therefore, in the present disclosure, a mechanism which is capable of improving utilization efficiency of frequency resources in wireless communication and a wireless communication device for realizing the mechanism are proposed.

2. One Embodiment of Present Disclosure

A wireless communication device according to one embodiment of the present disclosure will be described next. In the following description, a wireless communication device which transmits a first frame (hereinafter, also referred to as an advanced frame) having a second region in which second frame transmission period information which will be described later is stored will be also referred to as a transmission device 100, and a wireless communication device which receives the advanced frame will be also referred to as a reception device 200. Note that the transmission device 100 may operate as the reception device 200, and the reception device 200 may operate as the transmission device 100. Further, a frame in related art which does not have the above-described second region will be also referred to as a legacy frame. As the legacy frame, there is a frame specified in one of wireless LAN standards such as, for example, IEEE 802.11a, 11b, 11g, 11n, 11ac and 11ad.

2.1. Configuration of Device

Figure 3:
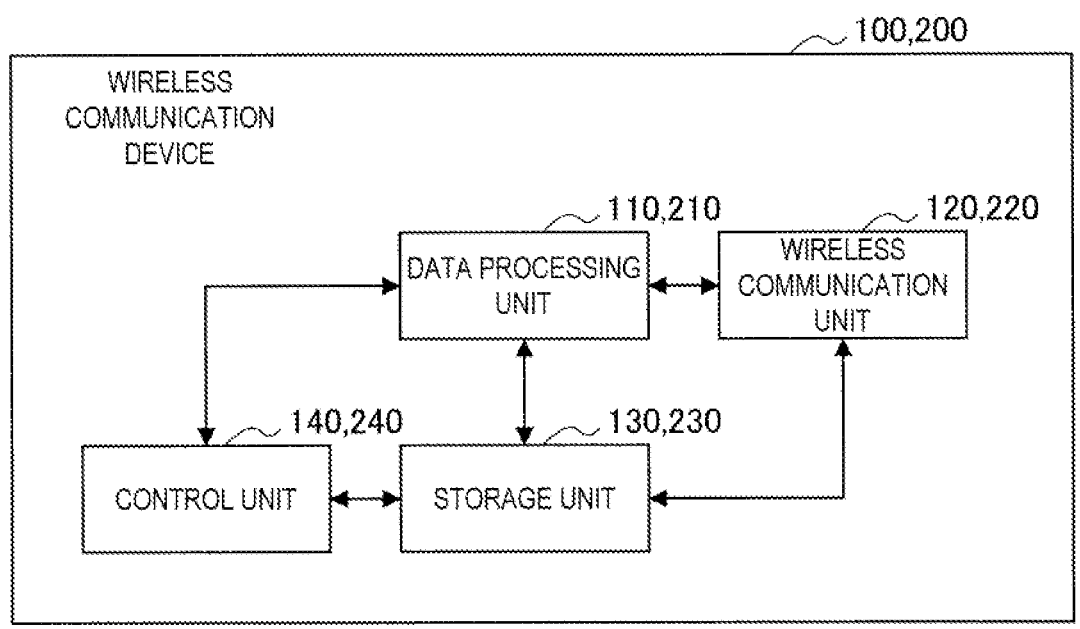
FIG. 3 is a block diagram illustrating an example of a schematic functional configuration of a wireless communication device according to one embodiment of the present disclosure.

First, functional configurations of the transmission device 100 and the reception device 200 according to one embodiment of the present disclosure will be described with reference to FIG. 3. Note that, because the functional configurations of the transmission device 100 and the reception device 200 are substantially the same, only the functional configuration of the transmission device 100 will be described. FIG. 3 is a block diagram illustrating an example of a schematic functional configuration of the wireless communication device according to one embodiment of the present disclosure.

As illustrated in FIG. 3, the transmission device 100 includes a data processing unit 110, a wireless communication unit 120, a control unit 130 and a storage unit 140.

The data processing unit 110 performs processing for transmission and reception on data as part of the processing unit. Specifically, the data processing unit 110 generates a frame on the basis of data from a communication upper layer, and provides the generated frame to the wireless communication unit 120. For example, the data processing unit 110 generates a frame (or a packet) from data and performs processing such as addition of a MAC header and addition of an error detecting code for media access control (MAC) on the generated frame. Further, the data processing unit 110 extracts data from the received frame and provides the extracted data to the communication upper layer. For example, the data processing unit 110 acquires data by performing analysis of the MAC header, detection and correction of a code error, reorder processing, or the like, on the received frame.

The wireless communication unit 120 performs signal processing such as modulation and demodulation for a frame and transmission and reception of a signal via an antenna as part of a transmission unit and a reception unit. Specifically, the wireless communication unit 120 generates a symbol stream by performing encoding, interleaving and modulation in accordance with coding and modulation schemes set by the control unit 130 for a frame provided from the data processing unit 110. The wireless communication unit 120 then converts a signal relating to the obtained symbol stream into an analog signal, amplifies and filters the analog signal and up-converts a frequency of the amplified and filtered analog signal. The wireless communication unit 120 then transmits the processed signal via an antenna. Further, the wireless communication unit 120 obtains a symbol stream by performing processing inverse to processing upon signal transmission, for example, frequency down-conversion, digital signal conversion, or the like, on the signal obtained via the antenna. The wireless communication unit 120 then acquires a frame by performing demodulation, decoding, or the like, on the obtained symbol stream and provides the acquired frame to the data processing unit 110 or the control unit 130.

The control unit 130 controls the whole communication of the transmission device 100 as part of the processing unit, the transmission unit and the reception unit. Specifically, the control unit 130 performs processing such as passing of information among functions, setting of communication parameters and scheduling of frames (packets) at the data processing unit 110.

The storage unit 140 stores information to be used for processing of the data processing unit 110 or the control unit 130. Specifically, the storage unit 140 stores information stored in frames, information acquired from frames, information of communication parameters, or the like.

Note that the transmission device 100 and the reception device 200 may perform wired communication. For example, the transmission device 100 and the reception device 200 may be connected to the Internet and may include a wired communication unit which performs communication with external devices via the Internet.

2.2. Functions of Device

Functions of the transmission device 100 and the reception device 200 will be described next. Here, an example will be described where the transmission device 100 and the reception device 200 have a virtual carrier sensing function using RTS/CTS, and an RTS frame and a CTS frame are transmitted as advanced frames. Note that, because basic functions of the virtual carrier sensing are substantially the same as the above-described functions, description will be omitted.

[Function of Transmission Device]

A function of the transmission device 100 will be described first. The transmission device 100 has an advanced frame transmission function.

(Advanced Frame Transmission Function)

Figure 4:
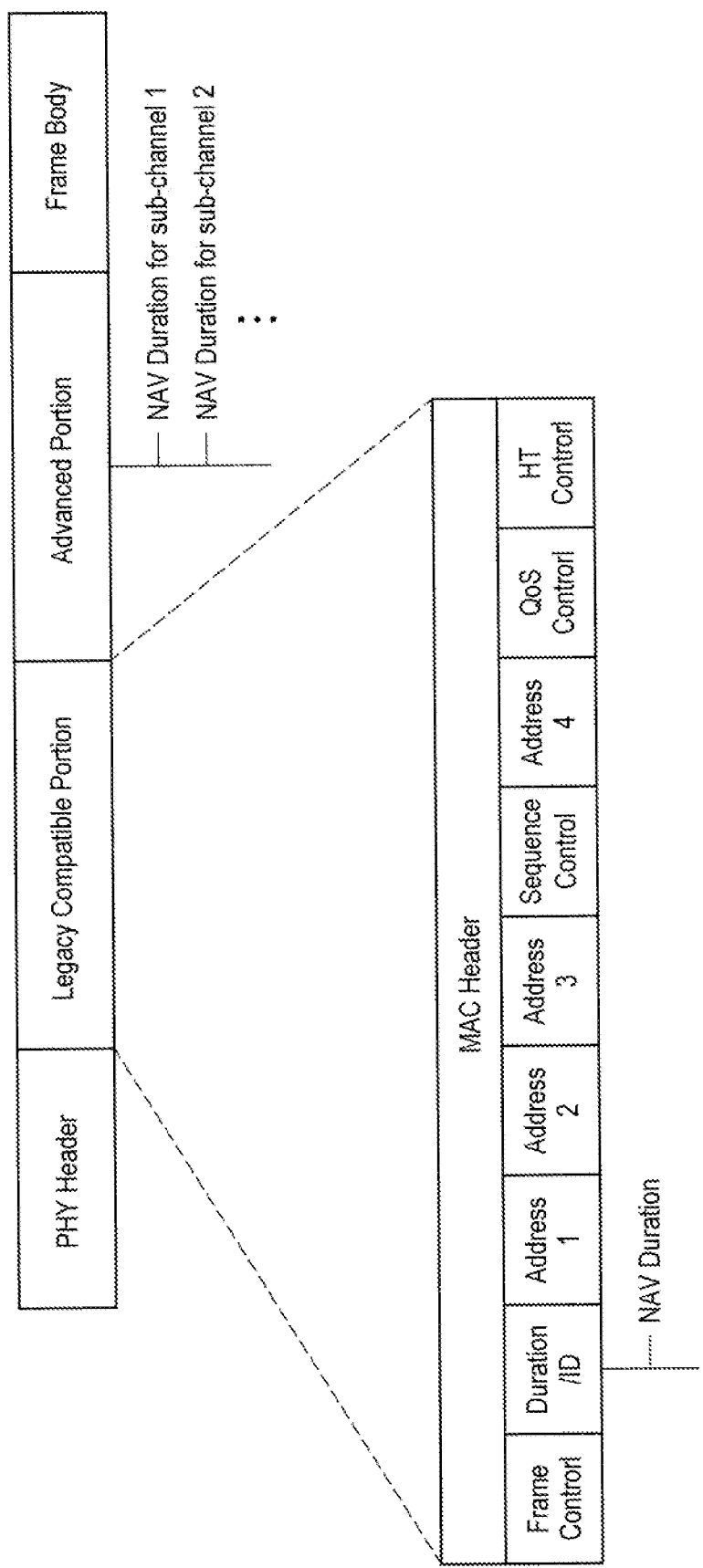
FIG. 4 is a diagram illustrating a configuration example of an advanced frame to be communicated by the wireless communication device according to one embodiment of the present disclosure.

The transmission device 100 transmits an advanced frame in which two types of frame transmission period information are stored. Specifically, the transmission device 100 transmits an advanced frame having a first region in which first frame transmission period information is stored and a second region which is subsequent to the first region and in which second frame transmission period information is stored. The second frame transmission period information is frame transmission period information corresponding to a frequency. For example, the control unit 130 determines a communication period and a communication frequency on the basis of a size, or the like, of data to be communicated. The control unit 130 then generates the first frame transmission period information from the determined communication period and generates the second frame transmission period information from the determined communication period and communication frequency. The control unit 130 then causes the data processing unit 110 to generate an advanced frame in which the generated first frame transmission period information and second frame transmission period information are respectively stored in the first region and the second region. The wireless communication unit 120 then transmits the generated advanced frame. Further, the advanced frame will be described in detail with reference to FIG. 4. FIG. 4 is a diagram illustrating a configuration example of the advanced frame to be communicated by the wireless communication device according to one embodiment of the present disclosure.

The advanced frame has the first region and the second region which is subsequent to the first region. The first region is a frame header, and the second region is a frame body. For example, as illustrated in FIG. 4, the advanced frame has fields such as a physical layer (PHY) header, a legacy compatible portion, an advanced portion and a frame body. The legacy compatible portion is a field as the first region, and may be, for example, a MAC header. Further, the advanced portion is a field as the second region.

In the first region, the first frame transmission period information is stored. For example, as illustrated in FIG. 4, a NAV duration (hereinafter, also referred to as a first NAV duration) is stored in the MAC header. The first NAV duration may be stored in a duration field of the MAC header in a similar manner to a frame format of IEEE 802.11 in related art.

In the second region, one or a plurality of pieces of second frame transmission period information is stored, and frequencies corresponding to the plurality of pieces of second frame transmission period information are different from each other. Further, a frequency corresponding to the second frame transmission period information is a frequency band (hereinafter, also referred to as a frequency channel or a channel), and the channel corresponding to the second frame transmission period information is part of a channel (hereinafter, also referred to as a sub-channel) for the first frame transmission period information. For example, as illustrated in FIG. 4, a plurality of NAV durations (hereinafter, also referred to as second NAV durations) are stored in the advanced portion, and the second NAV durations respectively correspond to sub-channels (for example, a sub-channel 1, a sub-channel 2) which are different from each other, within the channel relating to the first NAV duration stored in the MAC header. Note that, the corresponding sub-channel may be discerned from a storage order or a storage location of the second NAV duration. Further, the corresponding sub-channel may be discerned from information indicating a sub-channel corresponding to the second NAV duration, in which case, the information indicating the sub-channel is separately stored in the advanced portion.

Further, the second frame transmission period information may be substantially the same information as the first frame transmission period information. Specifically, the second frame transmission period information is information indicating a frame transmission period, and indicates the same value as a value indicated by the first frame transmission period information. For example, the first NAV duration is the same value as the second NAV duration of the sub-channel 1. Note that, for a channel in which a NAV is not set, the second NAV duration may be zero, or the second NAV duration itself does not have to be stored in the advanced frame.

Further, the advanced frame may be an RTS frame. For example, the control unit 130 causes the data processing unit 110 to generate an RTS frame (hereinafter, also referred to as an advanced RTS frame) in which the second frame transmission period information is stored in place of an RTS frame in related art (hereinafter, also referred to as a legacy RTS frame) which does not have the second region in execution of virtual carrier sensing. Note that the advanced RTS frame does not have to have the frame body illustrated in FIG. 4. Further, information for discerning between the legacy RTS frame and the advanced RTS frame may be stored in the advanced RTS frame. For example, frame type information for discerning the advanced RTS frame is stored in a frame control field within the MAC header.

[Functions of Reception Device]

Functions of the reception device 200 will be described first. The reception device 200 has an advanced frame reception function, a NAV setting function and an advanced frame transmission function.

(Advanced Frame Reception Function)

The reception device 200 receives an advanced frame transmitted from the transmission device 100. Specifically, the data processing unit 210 acquires the second frame transmission period information from the advanced frame received by the wireless communication unit 220. For example, the data processing unit 210 acquires frame type information from the MAC header of the advanced frame received by the wireless communication unit 220 and determines whether the acquired frame type information indicates an advanced frame. In the case where the frame type information indicates an advanced frame, the data processing unit 210 acquires the second NAV duration from the advanced portion which is subsequent to the MAC header after reception processing of the MAC header. Note that, in the case where the frame type information indicates a legacy frame, the data processing unit 210 acquires the first NAV duration from the MAC header in reception processing of the MAC header.

(NAV Setting Function)

The reception device 200 controls standby for transmission of a frame (that is, a NAV) on the basis of the second frame transmission period information stored in the advanced frame. Specifically, the control unit 230 sets a NAV for each of frequencies based on the second frame transmission period information acquired by the data processing unit 210. For example, the control unit 230 sets each of the second NAV durations as a NAV period for each of the sub-channels corresponding to the second NAV durations acquired by the data processing unit 210.

(Advanced Frame Transmission Function)

The reception device 200 transmits an advanced frame (hereinafter, also referred to as a response advanced frame) as a response to the advanced frame received from the transmission device 100. Specifically, the control unit 230 controls transmission of the response advanced frame in which the second frame transmission period information corresponding to a frequency is stored in a fourth region which is subsequent to a third region in which the first frame transmission period information is stored. Note that the third region corresponds to the first region, and the fourth region corresponds to the second region.

For example, when an advanced RTS frame whose destination is the reception device 200 itself is received, the control unit 230 determines whether to permit communication by the transmission device 100 which is a transmission source of the advanced RTS frame. In the case where it is determined to permit communication, the control unit 230 calculates third and fourth NAV durations by subtracting a transmission period of a CTS frame (hereinafter, also referred to as an advanced CTS frame) in which the second frame transmission period information is stored and a period of short inter frame space (SIFS), or the like, from the first and second NAV durations acquired from the advanced RTS frame. The control unit 230 then causes the data processing unit 210 to generate the advanced CTS frame in which the calculated third and fourth NAV durations are respectively stored in the MAC header as the third region and the advanced portion as the fourth region. The wireless communication unit 220 then transmits the generated advanced CTS frame.

2.3. Processing of Device

Processing of the transmission device 100 and the reception device 200 will be described next.

[Processing of Transmission Device]

Figure 5:
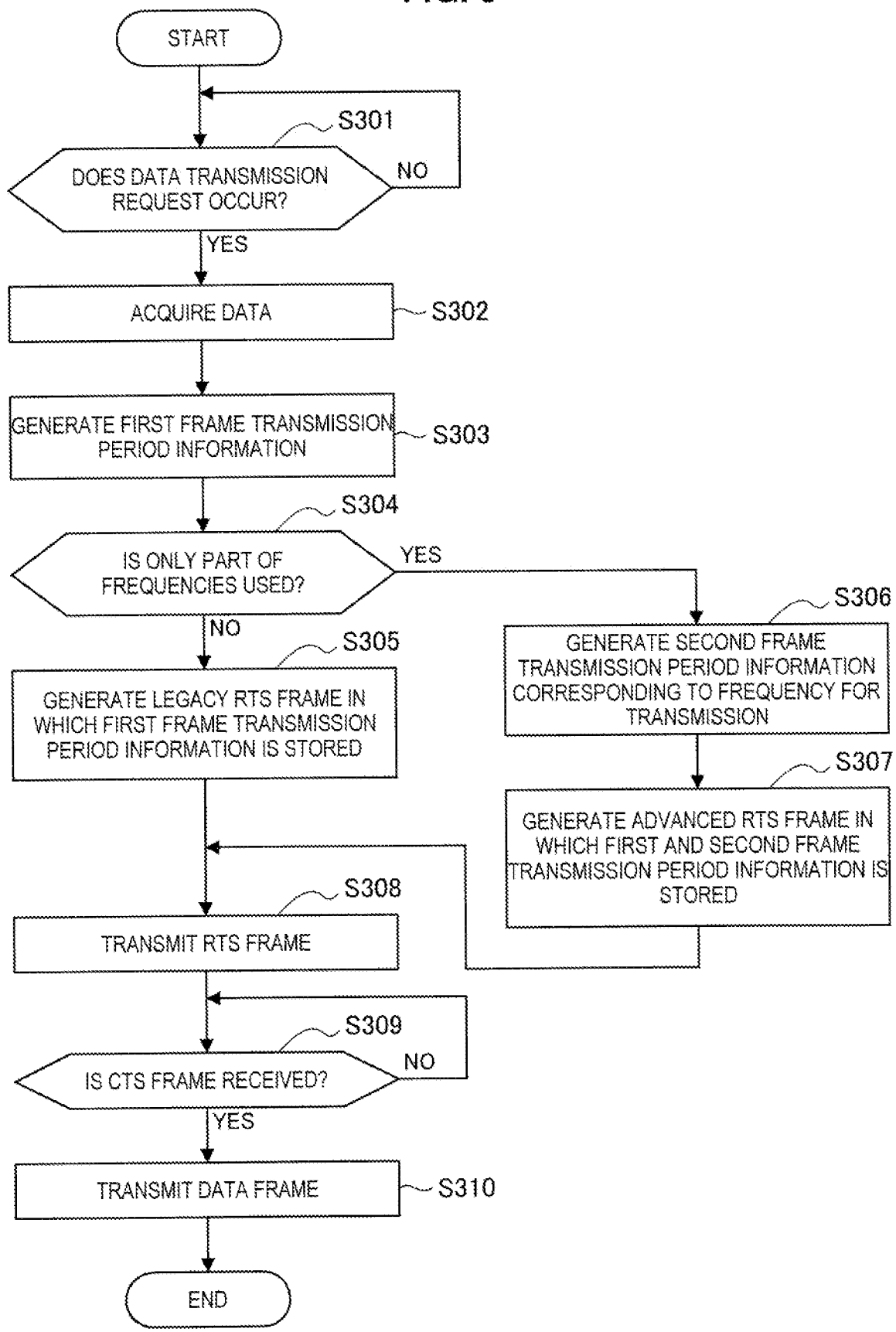
FIG. 5 is a flowchart schematically illustrating an example of processing of a transmission device according to one embodiment of the present disclosure.

First, processing of the transmission device 100 will be described with reference to FIG. 5. FIG. 5 is a flowchart schematically illustrating an example of the processing of the transmission device according to one embodiment of the present disclosure.

The transmission device 100 determines whether a data transmission request occurs (step S301). Specifically, the control unit 130 determines whether a notification of a data transmission request is made from the communication upper layer.

In the case where it is determined that a data transmission request occurs (step S301: Yes), the transmission device 100 acquires data (step S302). Specifically, the control unit 130 causes the data processing unit 110 to acquire data provided along with the data transmission request from a transmission buffer.

The transmission device 100 then generates the first frame transmission period information (step S303). Specifically, the control unit 130 determines the first NAV duration for data transmission on the basis of a size, or the like, of the acquired data.

The transmission device 100 then determines whether data is transmitted using only part of frequencies among available frequencies (step S304). Specifically, the control unit 130 determines whether data is transmitted using only part of sub-channels among sub-channels available for data transmission on the basis of the size, or the like, of the data. In other words, it is determined whether the reception device 200 is permitted to perform frequency division multiplex communication.

In the case where it is determined that data is transmitted using all the available frequencies (step S304: No), the transmission device 100 generates a legacy RTS frame in which the first frame transmission period information is stored. Specifically, in the case where it is determined that data is transmitted using the entire available channel, the control unit 130 causes the data processing unit 110 to generate the legacy RTS frame in which the first NAV duration is stored, and the second NAV duration is not stored.

On the other hand, in the case where it is determined that data is transmitted using only part of frequencies among available frequencies (step S304: Yes), the transmission device 100 generates the second frame transmission period information corresponding to a frequency for transmission (step S306). Specifically, in the case where it is determined that data is transmitted using only part of sub-channels, the control unit 130 determines the second NAV durations respectively corresponding to sub-channels of available channels. In more detail, the control unit 130 determines the same value as a value of the first NAV duration as the second NAV duration corresponding to a sub-channel which is used for data transmission, and determines zero as the second NAV duration corresponding to a sub-channel which is not used for data transmission.

The transmission device 100 then generates an advanced RTS frame in which the first frame transmission period information and the second frame transmission period information are stored (step S307). Specifically, the control unit 130 causes the data processing unit 110 to generate an advanced RTS frame in which the generated second NAV duration is stored.

The transmission device 100 then transmits the generated RTS frame (step S308). Specifically, the wireless communication unit 120 transmits the generated legacy RTS frame or advanced RTS frame.

The transmission device 100 then determines whether a CTS frame is received (step S309). Specifically, the control unit 130 determines whether a legacy CTS frame or an advanced CTS frame addressed to the transmission device 100 is received as a response to the legacy RTS frame or the advanced RTS frame.

In the case where it is determined that a CTS frame is received (step S309: Yes), the transmission device 100 transmits a data frame (step S310). Specifically, in the case where the legacy RTS frame or the advanced CTS frame addressed to the transmission device 100 is received, the control unit 130 causes the data processing unit 110 to generate a data frame in which the acquired data is stored. The wireless communication unit 120 then transmits the generated data frame.

[Processing of Reception Device]

Figure 6:
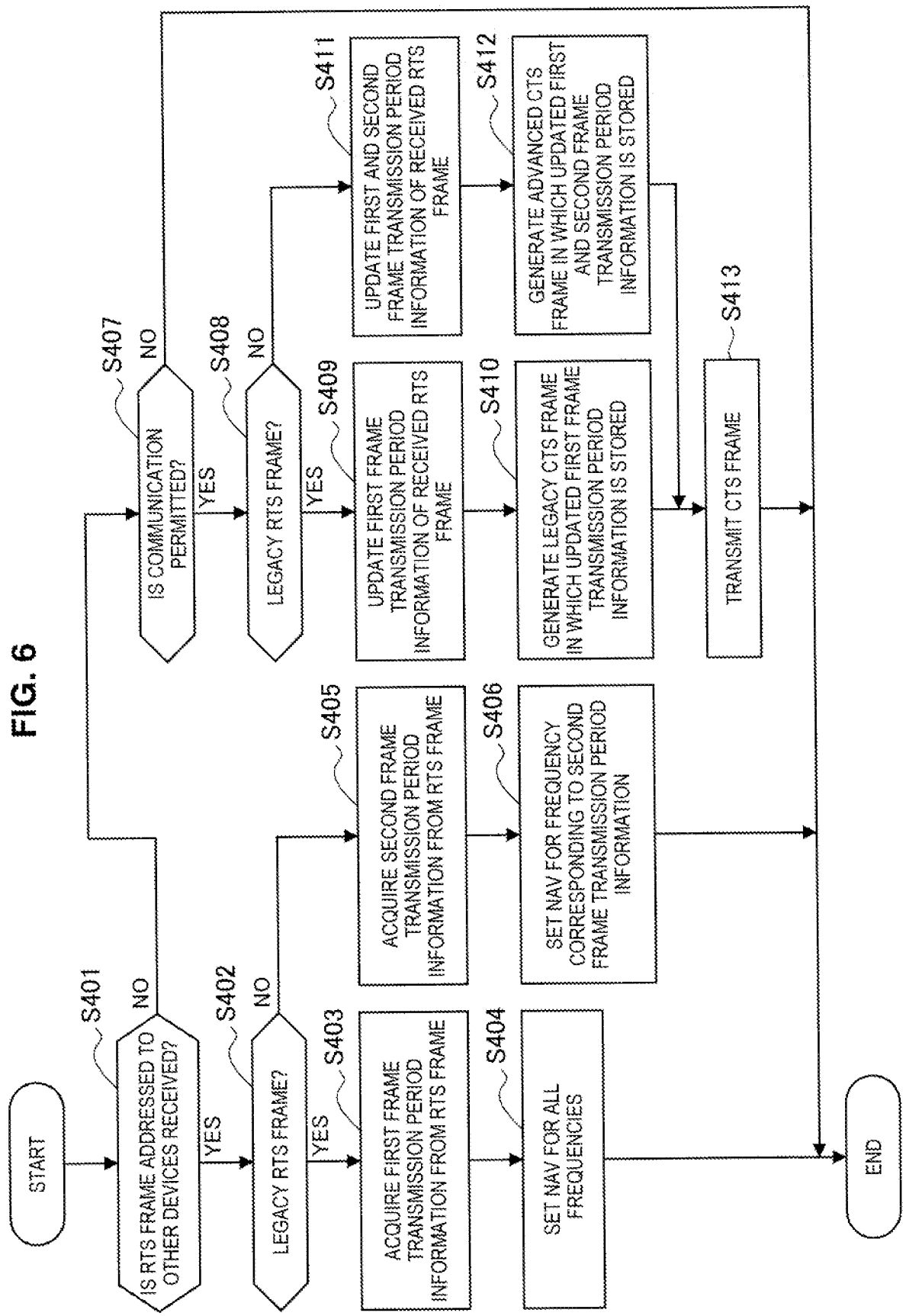
FIG. 6 is a flowchart schematically illustrating an example of processing of a reception device according to one embodiment of the present disclosure.

First, processing of the reception device 200 will be described with reference to FIG. 6. FIG. 6 is a flowchart schematically illustrating an example of the processing of the reception device according to one embodiment of the present disclosure.

The reception device 200 determines whether an RTS frame addressed to a wireless communication device other than the reception device 200 is received (step S401). Specifically, the data processing unit 210 acquires destination information from the RTS frame received by the wireless communication unit 220 and determines whether the acquired destination information indicates a wireless communication device other than the reception device 200.

In the case where it is determined that an RTS frame addressed to other wireless communication devices is received (step S401: Yes), the reception device 200 determines whether the received RTS frame is a legacy RTS frame (step S402). Specifically, the data processing unit 210 acquires frame type information from the received RTS frame and determines whether the acquired frame type information indicates a legacy RTS frame.

In the case where it is determined that the received RTS frame is a legacy RTS frame (step S402: Yes), the reception device 200 acquires the first frame transmission period information from the legacy RTS frame (step S403). Specifically, in the case where the frame type information indicates the legacy RTS frame, the data processing unit 210 acquires the first NAV duration from the MAC header of the legacy RTS frame.

The reception device 200 then sets a NAV for all the available frequencies (step S404). Specifically, the control unit 230 performs setting for the whole available channels by setting the acquired first NAV duration as a NAV period.

On the other hand, in the case where it is determined that the received RTS frame is an advanced RTS frame (step S402: No), the reception device 200 acquires the second frame transmission period information from the advanced RTS frame (step S405). Specifically, in the case where the frame type information indicates the advanced RTS frame, the data processing unit 210 acquires the first NAV duration from the MAC header of the advanced RTS frame and acquires at least one second NAV duration from the advanced portion.

The reception device 200 then sets a NAV for a frequency corresponding to the acquired second frame transmission period information (step S406). Specifically, the control unit 230 performs setting for each of sub-channels corresponding to the acquired second NAV duration by setting the second NAV duration as the NAV period.

Further, in the case where it is determined that an RTS frame addressed to the reception device 200 is received (step S401: No), the reception device 200 determines whether to permit communication by a transmission source of the RTS frame (step S407). Specifically, the control unit 230 determines whether to permit communication by the transmission device 100 which transmits the RTS frame.

In the case where it is determined to permit communication (step S407: Yes), and it is determined that the received RTS frame is a legacy RTS frame (step S408: Yes), the reception device 200 updates the first frame transmission period information stored in the received legacy RTS frame (step S409). Specifically, the control unit 230 subtracts a transmission period of the legacy CTS frame and the SIFS from the first NAV duration acquired from the legacy RTS frame.

The reception device 200 then generates a legacy CTS frame in which the updated first frame transmission period information is stored (step S410). Specifically, the control unit 230 causes the data processing unit 210 to generate a legacy CTS frame in which the first NAV duration from which the transmission period of the legacy CTS frame and the SIFS are subtracted is stored in the MAC header.

On the other hand, in the case where it is determined that the received RTS frame is an advanced RTS frame (step S408: No), the reception device 200 updates the first and the second frame transmission period information stored in the received advanced RTS frame (step S411). Specifically, the control unit 230 subtracts the transmission period of the advanced CTS frame and the SIFS from each of the first and the second NAV durations acquired from the advanced RTS frame.

The reception device 200 then generates an advanced CTS frame in which the updated first frame transmission period information and second frame transmission period information are stored (step S412). Specifically, the control unit 230 causes the data processing unit 110 to generate an advanced CTS frame in which the first and the second NAV durations from which the transmission period of the advanced CTS frame and the SIFS are subtracted are respectively stored in the MAC header and the advanced portion.

The reception device 200 then transmits the generated CTS frame (step S413). Specifically, the wireless communication unit 220 transmits the generated legacy CTS frame or advanced CTS frame.

2.4. Operation Examples

Figure 7:
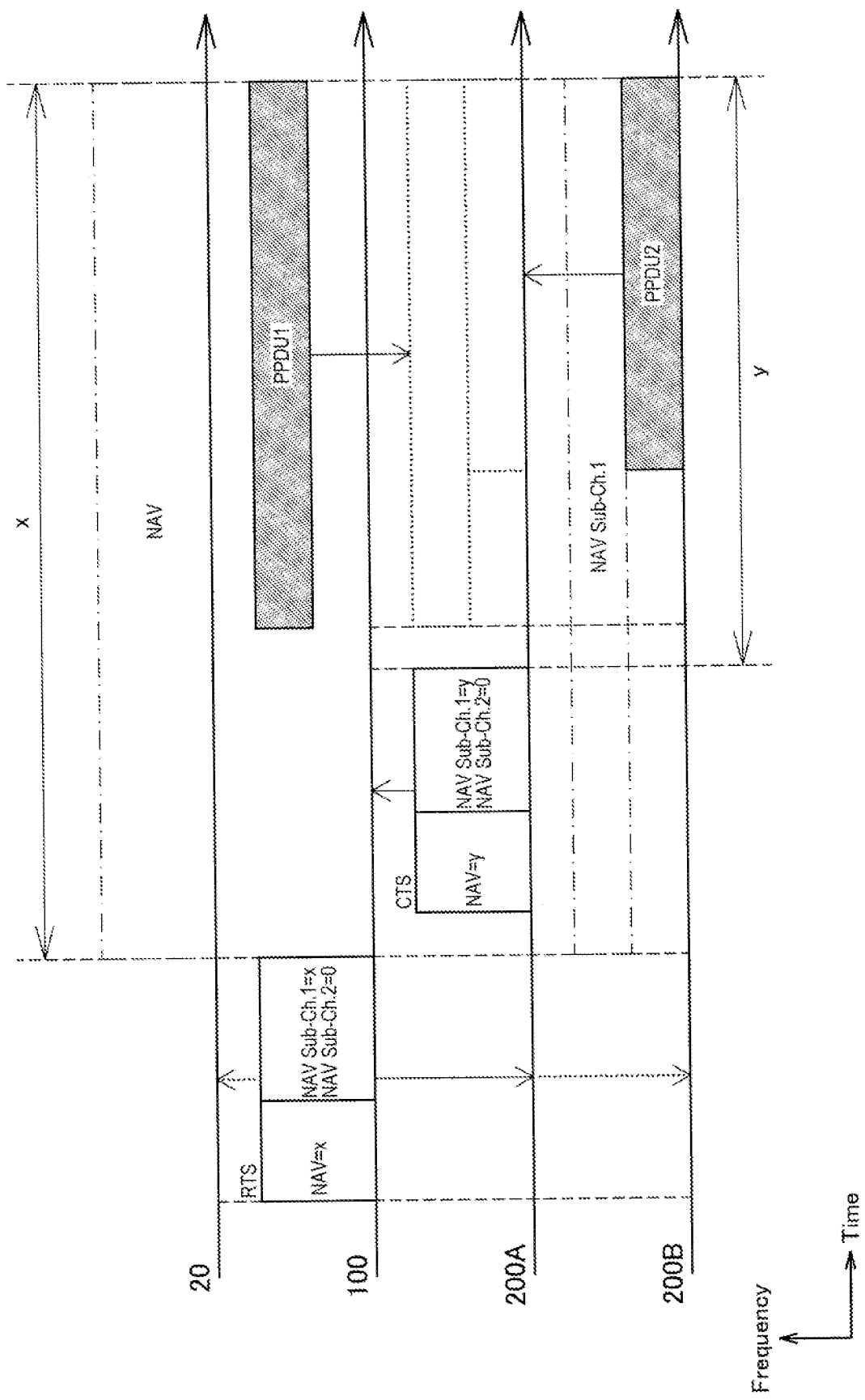
FIG. 7 is a frame sequence illustrating an operation example of the transmission device and the reception device according to one embodiment of the present disclosure.

The processing of the transmission device 100 and the reception device 200 has been described above. Operation examples of the transmission device 100 and the reception device 200 will be described next with reference to FIG. 7. FIG. 7 is a frame sequence illustrating the operation examples of the transmission device 100 and the reception device 200 according to one embodiment of the present disclosure.

First, when a data transmission request occurs, the transmission device 100 sets the first and the second frame transmission period information and transmits the advanced RTS frame in which the set information is stored. For example, the transmission device 100 respectively sets "x" as the first NAV duration, "x" as the second NAV duration corresponding to a sub-channel 1, and "0" as the second NAV duration corresponding to a sub-channel 2. The transmission device 100 then transmits the advanced RTS frame in which the set first NAV duration and each of the set second NAV durations are stored while setting a reception device 200A which is a data transmission destination as a destination.

When the advanced RTS frame is received, the reception device 200A which is the data transmission destination transmits the advanced CTS frame in which the updated first frame transmission period information and the updated second frame transmission period information are stored. For example, the reception device 200A updates the first NAV duration and the second NAV duration corresponding to the sub-channel 1, acquired from the received advanced RTS frame, from "x" to "y". Note that the second NAV duration corresponding to the sub-channel 2 remains "0". The reception device 200A then transmits the advanced CTS frame in which the updated first NAV duration and the updated second NAV duration are stored while setting the transmission device 100 which is a transmission source of the advanced RTS frame as a destination.

On the other hand, when the advanced RTS frame is received, a reception device 200B which is not a data transmission destination sets a NAV for each of part of frequencies among available frequencies on the basis of the second frame transmission period information stored in the advanced RTS frame. For example, the reception device 200B acquires a plurality of second NAV durations from the advanced RTS frame and sets a NAV while setting the NAV period for "x" for the sub-channel 1 corresponding to the second NAV duration whose value is not "0" but "x" among the acquired plurality of second NAV durations. On the other hand, for the sub-channel 2, because the second NAV duration is "0", a NAV is not set.

Further, the reception device 200 in related art which is not a data transmission destination (hereinafter, also referred to as a legacy reception device 20) sets a NAV for the whole available frequencies on the basis of the first frame transmission period information stored in the advanced RTS frame. For example, while the legacy reception device 20 can receive the MAC header of the advanced RTS frame, the legacy reception device 20 cannot receive the advanced portion which is subsequent to the MAC header because a format of the advanced RTS frame is different from a format of the legacy RTS frame. Therefore, the legacy reception device 20 acquires only the first NAV duration from the MAC header and sets a NAV for the whole available channels by setting the acquired first NAV duration of "x" as the NAV period.

Then, the transmission device 100 which receives the advanced CTS frame transmits a PPDU using a frequency corresponding to the set second frame transmission period information. For example, the transmission device 100 transmits a PPDU 1 such as a data frame using only the sub-channel 1. Because a NAV is set for the sub-channel 1 at the reception device 200B and the legacy reception device 20, collision of communication does not occur in the sub-channel 1.

Here, the reception device 200B which receives the advanced RTS frame transmits the PPDU using a frequency which is not used for communication of the PPDU. For example, the reception device 200B transmits a PPDU 2 such as a data frame addressed to the reception device 200A using a channel 2 for which a NAV is not set. Because the sub-channel 2 is an idle channel which is not used by the transmission device 100, collision of communication does not occur in the sub-channel 2.

Note that, in the case where a reception device 200 other than a destination (transmission device 100) of the advanced CTS frame receives the advanced CTS frame, the reception device 200 sets a NAV for a frequency based on the second frame transmission period information stored in the advanced CTS frame.

2.5. Conclusion of One Embodiment of Present Disclosure

In this manner, according to one embodiment of the present disclosure, the transmission device 100 generates a first frame in which the second frame transmission period information corresponding to a frequency is stored in the second region which is subsequent to the first region in which the first frame transmission period information is stored, and transmits the first frame. Further, the reception device 200 receives the above-described first frame and stands by for transmission of a frame in a frequency based on the first frame transmission period information stored in the first frame.

In virtual carrier sensing using RTS/CTS in related art, a NAV is set for the whole available frequencies. Therefore, in the case where communication is performed using only part of the frequencies, although frequencies other than the frequency used for communication are available, wireless communication devices other than the wireless communication device which performs communication cannot use the other frequencies.

In contrast, according to one embodiment of the present disclosure, because a NAV is set for each frequency, the reception device 200 other than the transmission device 100 can utilize frequencies which are not used for communication. Therefore, it becomes possible to improve utilization efficiency of frequency resourced in wireless communication while avoiding collision of communication.

Further, a plurality of pieces of the above-described second frame transmission period information are stored in the above-described first frame, and frequencies corresponding to the plurality of pieces of second frame transmission period information are different from each other. The reception device 200 then stands by for transmission of a frame at each frequency based on the second frame transmission period information. Therefore, it is possible to set the second frame transmission period information for three or more frequencies. Accordingly, because setting of a NAV can be controlled in unit of finer frequency, frequency resources are likely to be used up even in the case where there are a variety of frame sizes, so that it becomes possible to further improve utilization efficiency of frequency resources.

Further, the above-described second frame transmission period information includes the same information as the above-described first frame transmission period information. Here, in the case where the second NAV duration set for a specific frequency at the reception device 200 is shorter than the first NAV duration set at the legacy reception device 20, there is a possibility that the reception device 200 may start communication using the specific frequency prior to the legacy reception device 20, which may result in reducing transmission opportunities of the legacy reception device 20. To address this, by the second NAV duration and the first NAV duration being set at the same value, it is possible to prevent occurrence of a difference between the NAV set at the legacy reception device 20 and the NAV set at the reception device 200. Therefore, it becomes possible to suppress reduction in transmission opportunities of the legacy reception device 20 due to transmission by the reception device 200.

Further, the frequency corresponding to the above-described second frame transmission period information includes a frequency band, and a frequency band corresponding to the second frame transmission period information includes part of a frequency band for the above-described first frame transmission period information. Here, a channel with which a frame can be transmitted is generally specified by communication standards. Therefore, by a sub-channel for which a NAV can be set being provided within a range of the channel specified by the communication standards, it becomes possible to improve utilization efficiency of frequency resources in communication while conforming to the communication standards.

Further, the above-described second frame transmission period information includes information indicating a frame transmission period. The reception device 200 then stands by for transmission of a frame at each frequency corresponding to the second frame transmission period information indicating the frame transmission period. Therefore, the reception device 200 can set a NAV only with information notified using the advanced frame. Accordingly, it is possible to simplify processing or a configuration of the reception device 200, so that it becomes possible to suppress processing load or manufacturing cost.

Further, the above-described first region includes a frame header, and the above-described second region includes a frame body. Therefore, by the first NAV duration being stored in the frame header which can be interpreted by the legacy reception device 20, it is possible to cause the legacy reception device 20 which receives the advanced frame to set a NAV as in related art. Therefore, also in a state where the legacy reception device 20 and the reception device 200 are mixed, it becomes possible to improve utilization efficiency of frequency resource while avoiding collision of communication.

Further, the above-described first frame includes an RTS frame. Therefore, by control of a NAV using RTS/CTS being performed for each frequency, it becomes possible to improve utilization efficiency of frequency resources while solving a hidden terminal problem.

Further, the reception device 200 transmits the second frame in which the second frame transmission period information corresponding to a frequency is stored in the fourth region which is subsequent to the third region in which the first frame transmission period information is stored, as a response to the above-described first frame. It is therefore possible to suppress occurrence of mismatch between the NAV set by the first frame and the NAV set by the second frame. Accordingly, it becomes possible to prevent transmission opportunities of the reception device 200 which receives the second frame from becoming less than transmission opportunities of the reception device 200 which receives the first frame. By this means, it becomes possible to secure fairness of transmission opportunities.

2.6. Modified Examples

One embodiment of the present disclosure has been described above. Note that one embodiment of the present disclosure is not limited to the above-described examples. First and second modified examples of the present embodiment will be described below.

First Modified Example

Figure 8:
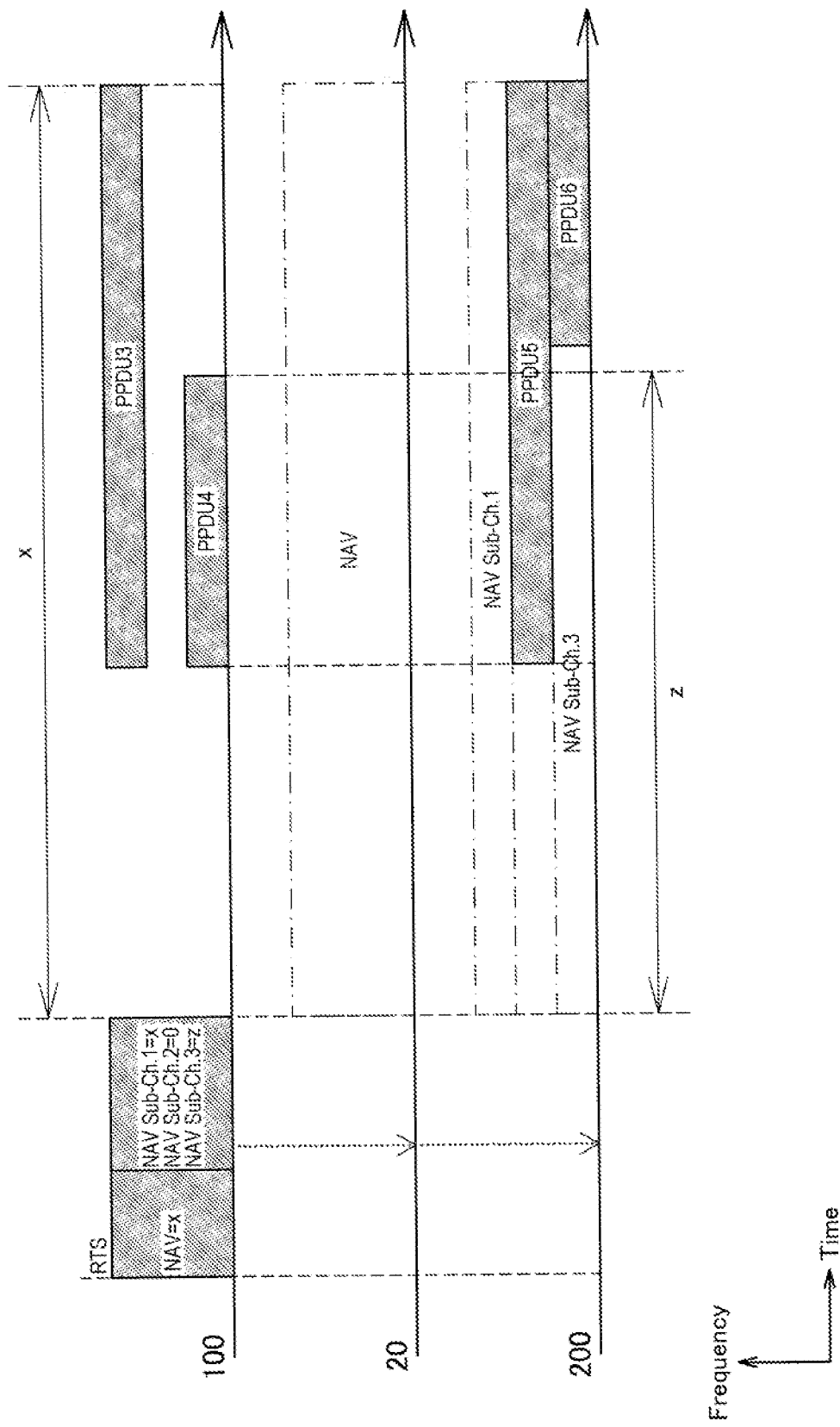
FIG. 8 is a frame sequence illustrating an operation example of a transmission device and a reception device according to first and second modified examples of one embodiment of the present disclosure.

As a first modified example of one embodiment of the present disclosure, a plurality of pieces of second frame transmission period information stored in the advanced frame may be different from each other. Further, the second frame transmission period information may be different from the first frame transmission period information. Specifically, at least two of the plurality of second NAV durations stored in the advanced frame are different from each other. Further, the second frame transmission period information according to the present modified example will be described with reference to FIG. 8. FIG. 8 is a frame sequence illustrating operation examples of the transmission device 100 and the reception device 200 according to the first and the second modified examples of one embodiment of the present disclosure. Note that description which is substantially the same as that described with reference to FIG. 7 will be omitted.

First, in the case where a data transmission request occurs, the transmission device 100 transmits the advanced RTS frame in which the set first transmission period information and the set second frame transmission period information are stored. For example, the transmission device 100 respectively sets "x" as the first NAV duration, "x" as the second NAV duration corresponding to the sub-channel 1, "0" as the second NAV duration corresponding to the sub-channel 2, and "z" as the second NAV duration corresponding to a sub-channel 3. Because "0" means that a NAV period is not set, it can be said that, substantially, "x" and "z" which are different from each other are set for the sub-channels 1 and 3. Further, while "x" is the same as the first NAV duration, "z" is different from the first NAV duration and smaller than "x" (that is, x>z). The transmission device 100 then transmits the advanced RTS frame in which the set first NAV duration and each of the set second NAV durations are stored.

When the advanced RTS frame is received, the reception device 200 which is not a data transmission destination sets a NAV for each sub-channel on the basis of the second frame transmission period information stored in the advanced RTS frame. For example, the reception device 200 acquires a plurality of second NAV durations from the advanced RTS frame, and sets a NAV for the sub-channel 1 corresponding to the second NAV duration whose value is "x" among the acquired plurality of second NAV durations by setting "x" as the NAV period. Further, the reception device 200 sets a NAV for the sub-channel 3 corresponding to the second NAV duration whose value is "z" by setting "z" as the NAV period. On the other hand, for the sub-channel 2, because the second NAV duration is "0", a NAV is not set.

Further, the legacy reception device 20 which is not a data transmission destination sets a NAV for the whole available frequencies on the basis of the first frame transmission period information stored in the advanced RTS frame.

Note that, in a similar manner to the case in FIG. 7, while the advanced CTS frame or the legacy CTS frame is transmitted after communication of the advanced RTS frame, illustration and description will be omitted here.

Then, the transmission device 100 which receives the advanced CTS frame transmits PPDUs respectively using the frequencies corresponding to the plurality of pieces of second frame transmission period information. For example, the transmission device 100 transmits a PPDU 3 using the sub-channel 1. Further, the transmission device 100 transmits a PPDU 4 using the sub-channel 3. Because a NAV is set in a period x for the sub-channel 1, and a NAV is set in a period z for the sub-channel 3 at the reception device 200, collision of communication does not occur in both the sub-channels 1 and 3.

Here, the reception device 200 which receives the advanced RTS frame transmits a PPDU using a frequency and a period which are not used for communication of PPDUs. For example, the reception device 200 transmits a PPDU 5 using the sub-channel 2 in which a NAV is not set. Further, the reception device 200 transmits a PPDU 6 using the sub-channel 3 which becomes idle after the period z has elapsed. Because the sub-channel 2 is an idle channel which is not used over the period x, and the sub-channel 3 is an idle channel which is not used over the period z, collision of communication does not occur in both the sub-channels 2 and 3.

In this manner, according to the first modified example, the plurality of pieces of second frame transmission period information stored in the advanced frame are different from each other. Here, there is a case where a size of data (frame) to be transmitted may be different for each frequency. In this case, if NAVs whose periods are the same are uniformly set at each frequency, there is a possibility that a NAV may be set also in a period during which communication is not actually performed. Therefore, by making it possible to set the second NAV durations which are different from each other, it becomes possible to further improve utilization efficiency of frequency resources. Note that, while an example has been described above where part of the second frame transmission period information is different from each other, all of the second frame transmission period information may be different from each other.

Further, the second frame transmission period information includes information different from the first frame transmission period information. As described above, there is a case where a size of data (frame) to be transmitted may be different for each frequency. In this case, if the second NAV duration is fixed at the first NAV duration, there is a possibility that a NAV is set also for a period during which communication is not actually performed. Therefore, by making it possible to set the second NAV duration which is different from the first NAV duration, it becomes possible to further improve utilization efficiency of frequency resources. Note that it is preferable that the second NAV duration is set at a smaller value than the value of the first NAV duration, because, if the second NAV duration is set at a greater value than the value of the first NAV duration, transmission opportunities of the reception device 200 can be made less than transmission opportunities of the legacy reception device 20.

Second Modified Example

Figure 9:
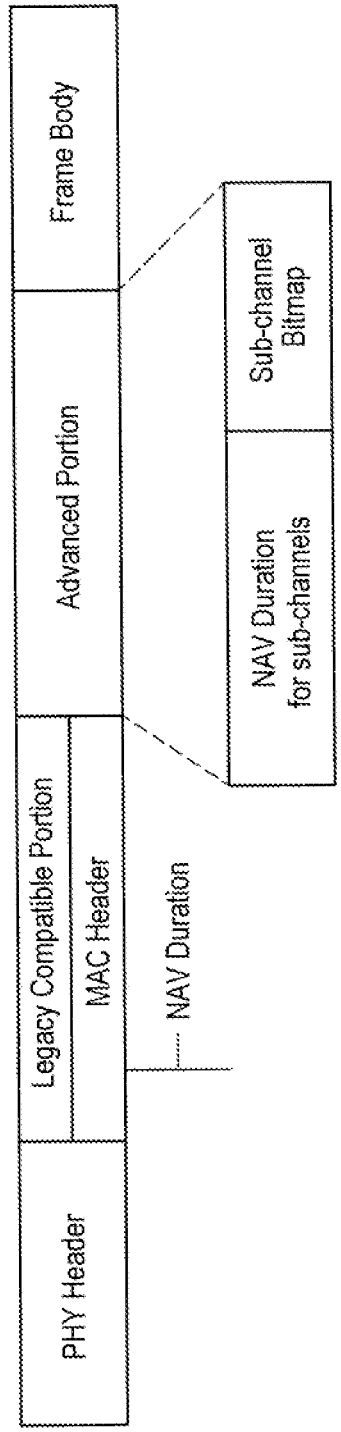
FIG. 9 is a diagram illustrating a configuration example of an advanced frame according to the second modified example of one embodiment of the present disclosure.

As a second modified example of one embodiment of the present disclosure, the second frame transmission period information may be information having a form other than information indicating the frame transmission period. Specifically, the second frame transmission period information may be information from which the frame transmission period is derived. Further, the reception device 200 stands by for transmission of a frame at each frequency corresponding to the second frame transmission period information from which the frame transmission period is derived. For example, the second frame transmission period information is flag information corresponding to each of part of frequencies available for communication. Further, the advanced frame according to the present modified example will be described in detail with reference to FIG. 9. FIG. 9 is a diagram illustrating a configuration example of the advanced frame according to the second modified example of one embodiment of the present disclosure.

The advanced frame has flag information corresponding to each of sub-channels for a channel available for communication. Specifically, in the advanced frame, bit information corresponding to the second NAV duration and each of the sub-channels is stored. For example, as illustrated in FIG. 9, the advanced portion of the advanced frame has fields such as a NAV duration for sub-channels and a sub-channel bitmap. The NAV duration for sub-channels is a field in which the second NAV duration is stored, and the sub-channel bitmap is a field in which bitmap information (hereinafter, also referred to as sub-channel bitmap) indicating sub-channels for which a NAV is set is stored.

For example, the control unit 230 of the reception device 200 selects a sub-channel for which a NAV is set with reference to the sub-channel bitmap acquired from the received advanced frame. A sub-channel is grasped because a sub-channel is associated with order or a location of bit information. The control unit 230 then sets the second NAV duration acquired from the received advanced frame as the NAV period for the selected sub-channel.

Note that, in the case where the first NAV duration is the same as the second NAV duration, the NAV duration for sub-channels illustrated in FIG. 9 may be omitted. In this case, the control unit 230 sets the first NAV duration as the NAV period for the selected sub-channel.

Further, while an example has been described above where the flag information corresponding to the sub-channel is bit information, the flag information may be information having three or more types of values. For example, a flag "0" is associated with no setting of a NAV, a flag "1" is associated with the second NAV duration, and a flag "2" is associated with the first NAV duration. Note that a plurality of second NAV durations may be prepared, in which case, different flags may be respectively prepared for the plurality of second NAV durations.

In this manner, according to the second modified example, the second frame transmission period information includes information from which the frame transmission period is derived, and the reception device 200 stands by for transmission of a frame for each frequency corresponding to the second frame transmission period information from which the frame transmission period is derived. Here, an information amount of information from which a value is derived is generally smaller than an information amount of information indicating a value itself. Therefore, compared to a case where information indicating the frame transmission period is stored in the advanced frame, it is possible to reduce a communication amount. Accordingly, it becomes possible to further improve utilization efficiency of wireless communication resources.

3. Application Example

The technology according to the present disclosure can be applied to various products. For example, the wireless communication device 100 (may also be a wireless communication device 200) may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the wireless communication device 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the wireless communication device 100 may be wireless communication modules mounted in such terminals (for example, integrated circuit modules configured by one die).

On the other hand, for example, the wireless communication device 100 may be realized as a wireless LAN access point (also referred to as a wireless base station) which has a router function or does not have a router function. The wireless communication device 100 may be realized as a mobile wireless LAN router. The wireless communication device 100 may also be a wireless communication module (for example, an integrated circuit module configured with one die) mounted on such devices.

3-1. First Application Example

Figure 10:
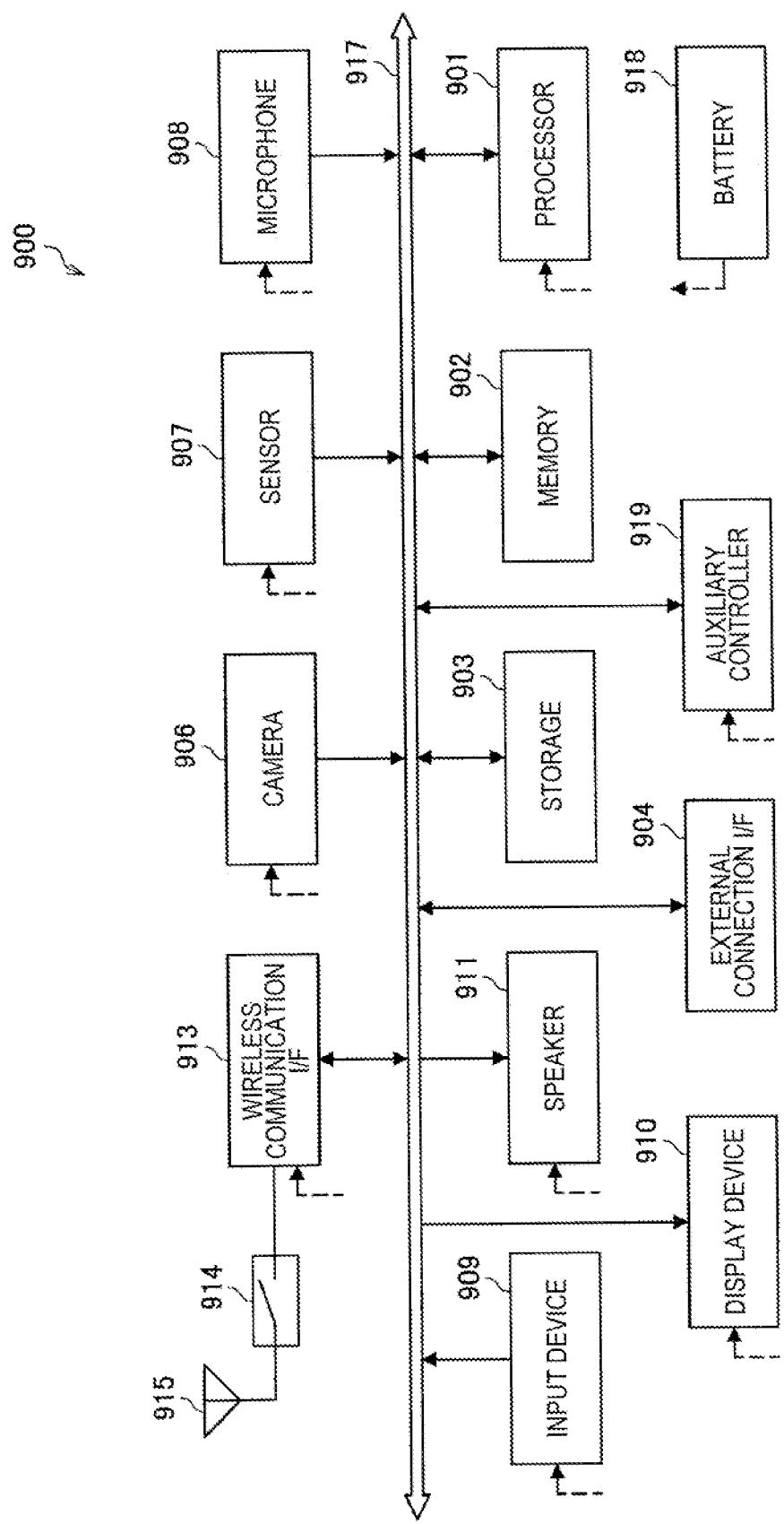
FIG. 10 is a block diagram illustrating an example of a schematic configuration of a smartphone.

FIG. 10 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 10. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 10 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 10, the data processing unit 110, the wireless communication unit 120, and the control unit 130 described above with reference to FIG. 3 may be mounted on a wireless communication interface 913. In addition, at least a part of these functions may be mounted on a processor 901 or an auxiliary controller 919. For example, the control unit 130 communicates the advanced frame in which the second frame transmission period information corresponding to a frequency is stored in the second region which is subsequent to the first region in which the first frame transmission period information is stored, via the data processing unit 110 and the wireless communication unit 120. By this means, other communication terminals can use sub-channels which are not used for communication by the smartphone 900. Therefore, it becomes possible to improve utilization efficiency of frequency resources in wireless communication.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 11:
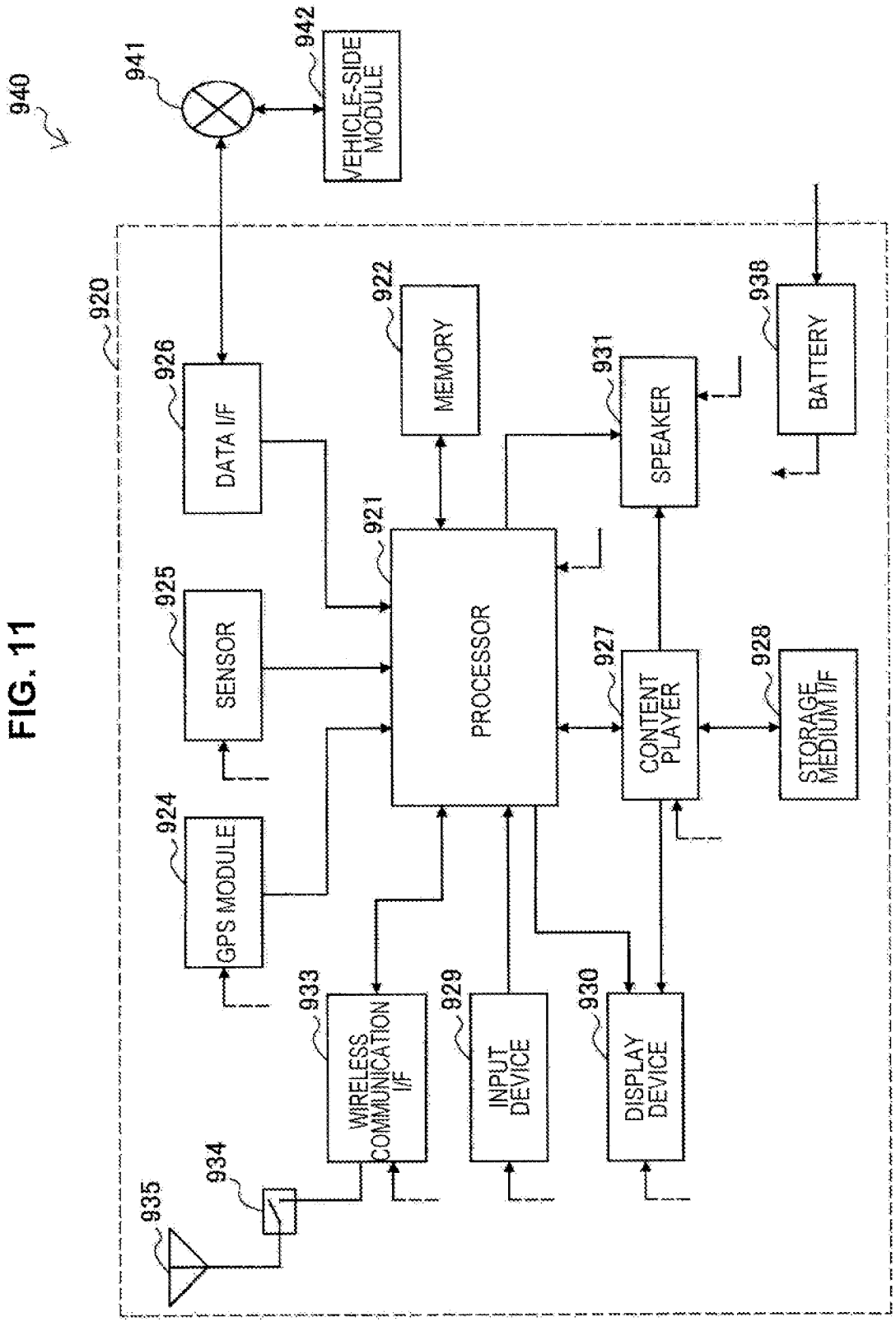
FIG. 11 is a block diagram illustrating an example of a schematic configuration of a car navigation device.

FIG. 11 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 11. In this case, the antenna switch 934 may be omitted from the configuration of the car navigation device 920.

The battery 938 supplies electric power to each of the blocks of the car navigation device 920 illustrated in FIG. 11 via power supply lines partially indicated by dashed lines in the drawing. In addition, the battery 938 accumulates electric power supplied from the vehicle side.

In the car navigation device 920 illustrated in FIG. 11, the data processing unit 110, the wireless communication unit 120, and the control unit 130 described above with reference to FIG. 3 may be mounted on a wireless communication interface 933. In addition, at least a part of these functions may be mounted on a processor 921. For example, the control unit 130 communicates the advanced frame in which the second frame transmission period information corresponding to a frequency is stored in the second region which is subsequent to the first region in which the first frame transmission period information is stored, via the data processing unit 110 and the wireless communication unit 120. By this means, other communication terminals can use sub-channels which are not used for communication by the car navigation device 920. Therefore, it becomes possible to improve utilization efficiency of frequency resources in wireless communication space in which the car navigation device 920 is provided.

Further, the wireless communication interface 933 may operate as the above-described access point and may provide wireless connection to a terminal possessed by a user who is on board a vehicle. In this event, for example, the control unit 130 transmits the advanced CTS frame in which the first frame transmission period information and the second frame transmission period information corresponding to a frequency are stored as a response to the advanced RTS frame transmitted from the terminal. By this means, compared to a case where the legacy CTS frame is transmitted, transmission opportunities of the reception device 200 which receives the CTS frame increases. Therefore, it becomes possible to improve utilization efficiency of frequency resources.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

FIG. 12 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 12, the data processing unit 110, the wireless communication unit 120, and the control unit 130 described above with reference to FIG. 3 may be mounted on a wireless communication interface 963. In addition, at least a part of these functions may be mounted on a controller 951. For example, the control unit 130 transmits the advanced CTS frame in which the first frame transmission period information and the second frame transmission period information corresponding to a frequency are stored as a response to the advanced RTS frame transmitted from the terminal connected to the wireless access point 950. By this means, compared to a case where the legacy CTS frame is transmitted, transmission opportunities of the terminal which receives the CTS frame increases. Therefore, it becomes possible to improve utilization efficiency of frequency resources.

4. Conclusion

As described above, according to one embodiment of the present disclosure, by a NAV being set for each frequency, the reception device 200 other than the transmission device 100 can utilize frequencies which are not used for communication. Therefore, it becomes possible to improve utilization efficiency of frequency resources in wireless communication while avoiding collision of communication.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above-described embodiment, both the first frame transmission period information and the second frame transmission period information are stored in the advanced frame, the present technology is not limited to such an example. For example, an advanced frame in which the first frame transmission period information is not stored may be selectively communicated.

Further, while an example has been described in the above-described embodiment where the RTS frame or the CTS frame is an advanced frame, the advanced frame may be other types of frames. For example, a management frame such as a beacon or a data frame may be the advanced frame.

Further, while an example has been described in the above-described embodiment where sub-channels are fixed, the sub-channels may be variable. For example, the number or width of the sub-channels may be variable, and information indicating these or information from which these are derived may be stored in the advanced frame.

Further, while an example has been described in the above-described embodiment where a single reception device 200 performs communication using sub-channels for which a NAV is not set, a plurality of reception devices 200 may perform communication using the sub-channels. Note that, in this case, if the plurality of reception devices 200 perform communication using the same sub-channel, collision of communication can occur. Therefore, the reception device 200 starts communication, for example, after a random time period has elapsed from time at which transmission can be performed so that respective communication start times using idle sub-channels of the respective reception devices 200 are dispersed. Further, the reception device 200 may start communication in the case where idle sub-channels are sub-channels which are allocated to the respective reception devices 200 in advance. By this means, it is possible to suppress a possibility that collision of communication occurs in communication using idle sub-channels.

Further, the transmission device 100 and the reception device 200 may be applied to a network system such as machine to machine (M2M) and internet of things (IoT).

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in a wireless communication device 100 to exhibit functions equivalent to those of the respective functional configurations of the aforementioned wireless communication device 100. In addition, a storage medium that stores the computer program therein is also provided.

Additionally, the present technology may also be configured as below.

(1)

A wireless communication device including:

a processing unit configured to generate a first frame in which second frame transmission period information corresponding to a frequency is stored in a second region which is subsequent to a first region in which first frame transmission period information is stored; and a transmission unit configured to transmit the first frame.

(2)

The wireless communication device according to (1), in which a plurality of pieces of the second frame transmission period information are stored in the first frame, and frequencies corresponding to the plurality of pieces of the second frame transmission period information are different from each other.

(3)

The wireless communication device according to (2), in which the plurality of pieces of the second frame transmission period information are different from each other.

(4)

The wireless communication device according to (2) or (3), in which the second frame transmission period information includes a same information as the first frame transmission period information.

(5)

The wireless communication device according to any one of (2) to (4), in which the second frame transmission period information includes information different from the first frame transmission period information.

(6)

The wireless communication device according to any one of (2) to (5), in which a frequency corresponding to the second frame transmission period information includes a frequency band, and a frequency band corresponding to the second frame transmission period information includes part of a frequency band for the first frame transmission period information.

(7)

The wireless communication device according to any one of (1) to (6), in which the second frame transmission period information includes information indicating a frame transmission period.

(8)

The wireless communication device according to any one of (1) to (7), in which the second frame transmission period information includes information from which a frame transmission period is derived.

(9)

The wireless communication device according to any one of (1) to (8), in which the first region includes a frame header, and the second region includes a frame body.

(10)

The wireless communication device according to any one of (1) to (9), in which the first frame includes a request to send (RTS) frame.

(11)

A wireless communication device including:

a reception unit configured to receive a first frame in which second frame transmission period information corresponding to a frequency is stored in a second region which is subsequent to a first region in which first frame transmission period information is stored; and a transmission unit configured to stand by for transmission of a frame at a frequency based on the first frame transmission period information.

(12)

The wireless communication device according to (11), in which a plurality of pieces of the second frame transmission period information are stored in the first frame, frequencies corresponding to the plurality of pieces of the second frame transmission period information are different from each other, and the transmission unit stands by for transmission of a frame at each frequency based on the second frame transmission period information.

(13)

The wireless communication device according to (12), in which the plurality of pieces of the second frame transmission period information are different from each other.

(14)

The wireless communication device according to (12) or (13), in which the second frame transmission period information includes a same information as the first frame transmission period information.

(15)

The wireless communication device according to any one of (12) to (14), in which the second frame transmission period information includes information different from the first frame transmission period information.

(16)

The wireless communication device according to any one of (12) to (15), in which a frequency corresponding to the second frame transmission period information includes a frequency band, and a frequency band corresponding to the second frame transmission period information includes part of a frequency band for the first frame transmission period information.

(17)

The wireless communication device according to any one of (11) to (16), in which the second frame transmission period information includes information indicating a frame transmission period, and the transmission unit stands by for transmission of a frame at each frequency corresponding to the second frame transmission period information indicating the frame transmission period.

(18)

The wireless communication device according to any one of (11) to (17), in which the second frame transmission period information includes information from which a frame transmission period is derived, and the transmission unit stands by for transmission of a frame for each frequency corresponding to the second frame transmission period information from which a frame transmission period is derived.

(19)

The wireless communication device according to any one of (11) to (18), in which the first region includes a frame header, and the second region includes a frame body.

(20)

The wireless communication device according to any one of (11) to (19), in which the transmission unit transmits a second frame in which second frame transmission period information corresponding to a frequency is stored in a fourth region which is subsequent to a third region in which first frame transmission period information is stored, as a response to the first frame.

REFERENCE SIGNS LIST 100 transmission device
200 reception device
110, 210 data processing unit
120, 220 wireless communication unit
130, 230 control unit
140, 240 storage unit

The invention claimed is:

1. A wireless communication device comprising:
circuitry configured to
generate a first frame in which second frame transmission period information corresponding to a plurality of frequencies is stored in a second region which is subsequent to a first region in which first frame transmission period information is stored;
transmit the first frame; and
receive a second frame in which second frame transmission period information corresponding to the plurality of frequencies is stored in a fourth region which is subsequent to a third region in which first frame transmission period information is stored, as a response to the first frame.

2. The wireless communication device according to claim 1,
wherein a plurality of pieces of the second frame transmission period information are stored in the first frame, and
the plurality of frequencies corresponding to the plurality of pieces of the second frame transmission period information are different from each other.

3. The wireless communication device according to claim 2,
wherein the plurality of pieces of the second frame transmission period information are different from each other.

4. The wireless communication device according to claim 2,
wherein the second frame transmission period information includes a same information as the first frame transmission period information.

5. The wireless communication device according to claim 2,
wherein the second frame transmission period information includes information different from the first frame transmission period information.

6. The wireless communication device according to claim 2,
wherein a frequency corresponding to the second frame transmission period information includes a frequency band, and
a frequency band corresponding to the second frame transmission period information includes part of a frequency band for the first frame transmission period information.

7. The wireless communication device according to claim 1,
wherein the second frame transmission period information includes information indicating a frame transmission period.

8. The wireless communication device according to claim 1,
wherein the second frame transmission period information includes information from which a frame transmission period is derived.

9. The wireless communication device according to claim 1,
wherein the first region includes a frame header, and the second region includes a frame body.

10. The wireless communication device according to claim 1,
wherein the first frame includes a request to send (RTS) frame.

11. A wireless communication device comprising:
circuitry configured to
receive a first frame in which second frame transmission period information corresponding to a plurality of frequencies is stored in a second region which is subsequent to a first region in which first frame transmission period information is stored;
stand by for transmission of a frame at a frequency based on the first frame transmission period information; and
transmit a second frame in which second frame transmission period information corresponding to the plurality of frequencies is stored in a fourth region which is subsequent to a third region in which first frame transmission period information is stored, as a response to the first frame.

12. The wireless communication device according to claim 11,
wherein a plurality of pieces of the second frame transmission period information are stored in the first frame,
the plurality of frequencies corresponding to the plurality of pieces of the second frame transmission period information are different from each other, and
the circuitry is configured to stand by for transmission of a frame at each frequency based on the second frame transmission period information.

13. The wireless communication device according to claim 12,
wherein the plurality of pieces of the second frame transmission period information are different from each other.

14. The wireless communication device according to claim 12,
wherein the second frame transmission period information includes a same information as the first frame transmission period information.

15. The wireless communication device according to claim 12,
wherein the second frame transmission period information includes information different from the first frame transmission period information.

16. The wireless communication device according to claim 12,
wherein a frequency corresponding to the second frame transmission period information includes a frequency band, and
a frequency hand corresponding to the second frame transmission period information includes part of a frequency band for the first frame transmission period information.

17. The wireless communication device according to claim 11,
wherein the second frame transmission period information includes information indicating a frame transmission period, and
the circuitry is configured to stand by for transmission of a frame at each frequency corresponding to the second frame transmission period information indicating the frame transmission period.

18. The wireless communication device according to claim 11,
wherein the second frame transmission period information includes information from which a frame transmission period is derived, and
the circuitry is configured to stand by for transmission of a frame for each frequency corresponding to the second frame transmission period information from which a frame transmission period is derived.

19. The wireless communication device according to claim 11,
wherein the first region includes a frame header, and
the second region includes a frame body.

* * * * *